(12) United States Patent
De Groot et al.

(10) Patent No.: US 11,507,226 B1
(45) Date of Patent: Nov. 22, 2022

(54) RECOVERY STRATEGIES FOR CAPACITIVE BUTTON CALIBRATION

(71) Applicant: Datalogic IP Tech S.r.l., Lippo di Calderara di Reno (IT)

(72) Inventors: Nicola De Groot, Modena (IT); Davide Gavioli, Modena (IT); Enrico Lorenzoni, Ferrara (IT); Antonio Picciano, Bologna (IT)

(73) Assignee: Datalogic IP Tech S.R.L., Lippo di Calderara di (IT)

( * ) Notice: Subject to any disclaimer, the term of this patent is extended or adjusted under 35 U.S.C. 154(b) by 0 days.

(21) Appl. No.: 17/483,127

(22) Filed: Sep. 23, 2021

(51) Int. Cl.
*G06F 3/041* (2006.01)
*G06K 7/10* (2006.01)
*G06F 3/044* (2006.01)

(52) U.S. Cl.
CPC ............ *G06F 3/0418* (2013.01); *G06F 3/044* (2013.01); *G06K 7/109* (2013.01)

(58) Field of Classification Search
CPC ........ G06F 3/0418; G06F 3/044; G06K 7/109
See application file for complete search history.

(56) References Cited

U.S. PATENT DOCUMENTS

2012/0002684 A1    1/2012  Tay

FOREIGN PATENT DOCUMENTS

| EP | 2918956 A2 * | 9/2015 | ........... F25D 29/005 |
| EP | 2918956 B1 * | 6/2017 | ........... F25D 29/005 |

* cited by examiner

*Primary Examiner* — Michael Pervan
(74) *Attorney, Agent, or Firm* — Shook, Hardy & Bacon, L.L.P.

(57) ABSTRACT

A calibration process is started by a capacitive input variation when a capacitive button is pressed on a barcode reader. Or, the calibration process is started by the barcode reader scanning a configuration label or special label or barcode after the capacitive button on the barcode reader is inoperative. The calibration process realigns the input and the threshold to correctly configure the capacitive button.

16 Claims, 7 Drawing Sheets

RECOVERY STRATEGIES FOR CAPACITIVE BUTTON CALIBRATION

CROSS-REFERENCE TO RELATED APPLICATIONS

None.

BACKGROUND

Touch buttons are present on many products, but in typical applications, a system makes a calibration at start-up with an assumption that the buttons are not touched during this start-up process. As a result, it is possible to define a non-pressed level and tune the electronics relative to this non-pressed level.

There are systems that cannot make the assumption of buttons not being touched during the start-up process because these systems must detect button pressure during start-up. As a result, pre-calibration of the button is not possible. The need for re-calibration of a button is important because it provides a user with the opportunity to recover a product from a failing state. Without re-calibration, the product will not function correctly.

A touch button is part of an electronic sub-system that has the ability to detect a finger without having a physical electrical switch.

A capacitive button is composed of an electronic part inside a chip and an external electrical part composed of wires and one or more pads. Typically, there are two type of capacitive buttons, a self-capacitance button that measure the capacitance with respect to earth ground and a mutual capacitance button that measure the capacitance between two pads. The capacitive button is composed of analog and digital circuits, wires, and pads that are impacted by temperature variations. For this reason, a calibration is usually performed during start-up of a system or product so that the circuit only has to recognize a relative capacitance variation between "pressed" and "not pressed," and not recognize as an absolute value. Calibration is only possible for systems or products that have no need to detect fingers at start-up. Some solutions have been to store some parameters into the system or product, which are read upon start-up. For example, the calibration values are included into the software boot parameters of a software application. This makes the button become initialized exactly the same way after each product power-on. However, the drawback to this approach is that if the stored parameters become corrupted, the operation of the system or product is impacted, possibly making the button fail completely. Additionally, if the application is corrupted and needs to be upgraded, and the upgrading involves a button press, then the upgrade cannot occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention involve triggering a capacitive button calibration when there is a system or product failure. The capacitive button calibration can include tapping the button or reading a configuration barcode.

In a first aspect, a system for a recovery strategy for a capacitive button calibration when calibration is not automatically performed at start-up is provided that includes a barcode reader with an optional base station. A processor inside the barcode reader or the optional base station 1) is equipped with a capacitive sensing peripheral or 2) is connected to an external capacitive sensing component. The processor is unable to detect if a button is pressed or released, since a relationship between an input value and a threshold separating the two states is not correctly set. The system is configured to observe a change in capacitance when a human finger 1) comes in proximity to the button, or 2) touches the button. When the system detects the change in capacitance with a defined pattern, the processor starts a calibration process to restore a correct relationship between the input value and threshold. The system is configured to recognize if the button is pressed or released upon completion of the calibration process.

In another aspect, a system for a recovery strategy for a capacitive button calibration when calibration is not automatically performed at start-up is provided that includes a barcode reader with an optional base station. A processor inside the barcode reader or the optional base station 1) is equipped with a capacitive sensing peripheral or 2) is connected to an external capacitive sensing component. The processor is unable to detect if the capacitive sensing peripheral or the external capacitive sensing component is pressed or released, since a relationship between an input value and a threshold separating the two states is not correctly set. The barcode reader is configured to read a special label that triggers a calibration process of the capacitive sensing peripheral or the external capacitive sensing component to restore a correct relationship between the input value and the threshold. The system is configured to recognize if the capacitive sensing peripheral or the external capacitive sensing component is pressed or released upon completion of the calibration process.

In yet another aspect, a method for a recovery strategy for a capacitive button calibration for a system that does not perform calibration at start-up is provided that includes operating a barcode reader with an optional base station. A processor operates inside the barcode reader or the optional base station 1) is equipped with a capacitive sensing peripheral or 2) is connected to an external capacitive sensing component. The processor is unable to detect if the capacitive sensing peripheral or the external capacitive sensing component is pressed or released, since a relationship between an input value and a threshold separating the two states is not correctly set. The system is configured to observe a change in capacitance when a human finger 1) comes in proximity to the capacitive sensing peripheral or the external capacitive sensing component, or 2) touches the capacitive sensing peripheral or the external capacitive sensing component. When the system detects the change in capacitance with a defined pattern, the processor starts a calibration process to restore a correct relationship between the input value and threshold. The system is configured to recognize if the capacitive sensing peripheral or the external capacitive sensing component is pressed or released upon completion of the calibration process.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of aspects of the present invention is described with specificity herein to meet statutory requirements. However, the description itself is not intended to limit the scope of this patent.

Embodiments of the invention involve adding a calibration method that does not require that the system or product is calibrated each time on start up. A button is recalibrated if it does not work, but after recalibration, the button can be pressed to upgrade the software.

Embodiments of the present invention includes a processor with a capacitive sensitive peripheral or a processor connected to an external capacitive sensitive component. The processor can include various types of processors, including microprocessor, microcontroller, field programmable gate array (FPGA), etc. This capacitive sensitive peripheral or the external capacitive sensitive component may be in the form of a button on a device. The input value is different for different calibration values. The variation between a pressed button and a "not pressed" button remains approximately the same. Even with the variation being similar for a pressed and "not pressed" button, the system can still recognize an input variation. The recognition of the input variation results in the start of a calibration process being activated by a user tapping the button for a defined time.

Figure 1:
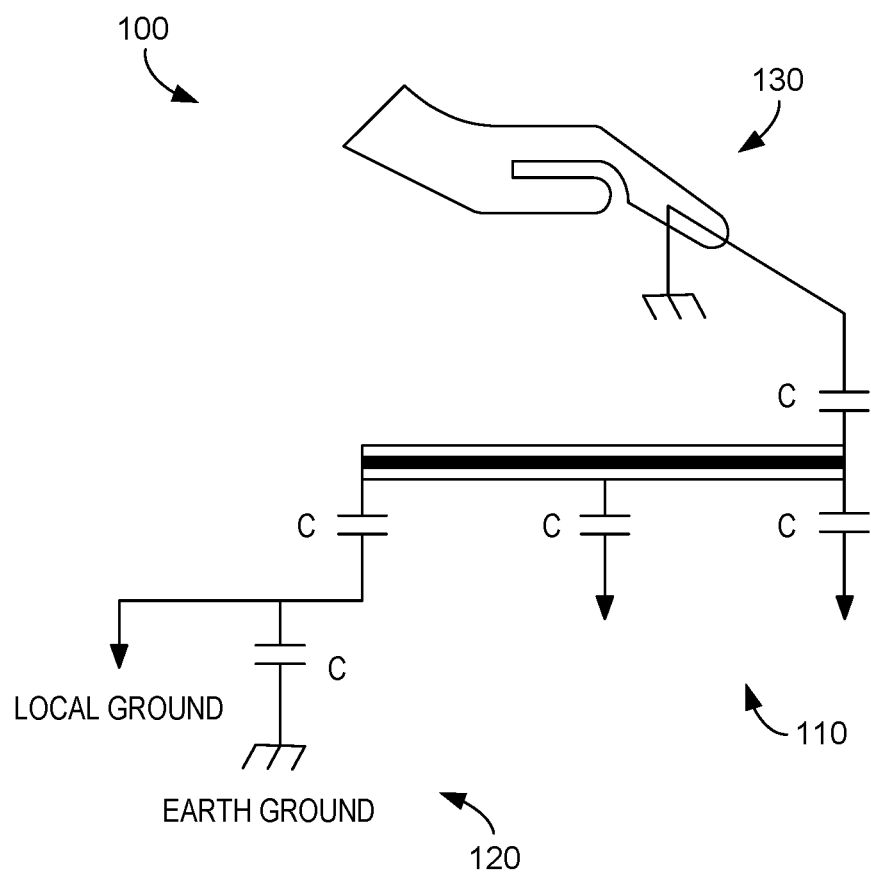
FIG. 1 is a schematic view of a self-capacitance button when touched by a finger, implemented in accordance with an embodiment of the present invention.

In FIG. 1, an overall capacitance 100 is shown illustrating the electrical connection of a capacitance button. Overall capacitance 100 is a measure of the capacitance with respect to local ground 120. Overall capacitance 100 can be measured to provide a value when there is a circuit 110 alone. Or, overall capacitance 100 can be measured when a finger 130 comes in proximity to circuit 110 or touches an interface connection to circuit 110. The interface connection can be a button. As one understands, overall capacitance 100 will result in different measurement values for circuit 110 alone or for circuit 110 touched by finger 130. For clarity, due to the electrical conductivity for electrical circuits, it is possible to generate overall capacitance 100 by having finger 130 come close to circuit 110, but not directly touching circuit 110. The close proximity of finger 130 to circuit 110 can be sufficient for overall capacitance 100 to change.

Figure 2:
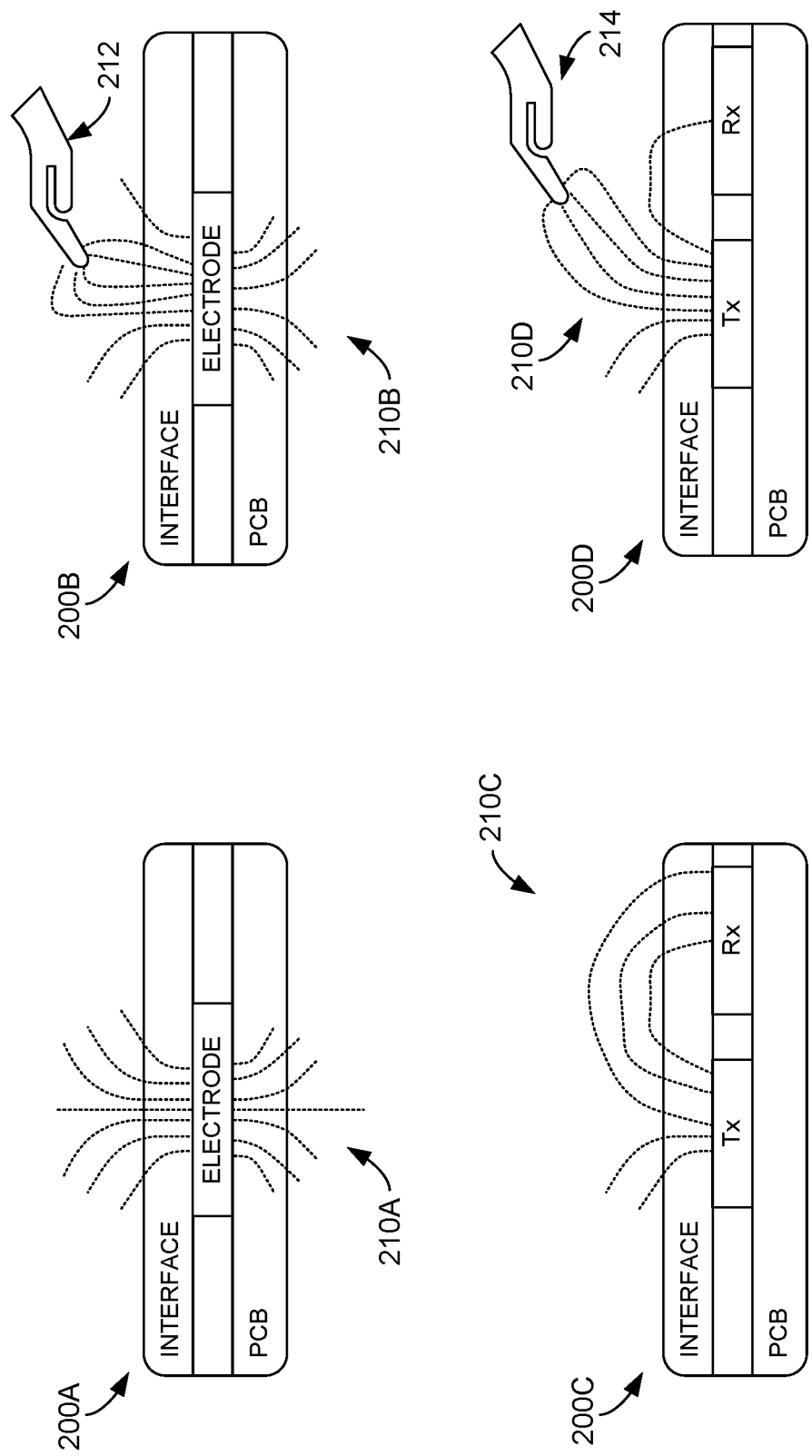
FIG. 2 is a view of self-capacitance and mutual capacitance buttons, implemented in accordance with an embodiment of the present invention.

Turning now to FIG. 2, a view 200 of self-capacitances 200A and 200B where self-capacitance 200A shows self-capacitance without an impact of a finger and self-capacitance 200B shows self-capacitance with the impact of the finger. View 200 also shows mutual capacitances 200C and 200D where mutual capacitance button 200C shows capacitance without an impact of a finger and mutual capacitance 200D shows capacitance with the impact of the finger. As one can see, an electric field 210A flows at 200A. A capacitance can be measured from this electric field 210A. Additionally, an electric field 210B flows, but looks different when a finger 212 comes in proximity to or touches 200B. The capacitance can be measured as well from this electric field 210B. Between buttons 210A and 210B, the capacitance will be different, primarily due to finger 212 coming in proximity to or touching 200B.

Similar to self-capacitances 200A and 200B, mutual capacitances 200C and 200D illustrate different capacitances, which are influenced by the presence of a finger 214 at 200D. Electric fields 210C and 210D are shown and the electric field 210D changes if another conductor comes close to it, which is finger 214 in the illustration. Therefore, the comparison between electric fields 210C and 210D shows a change in capacitance.

Figure 3:
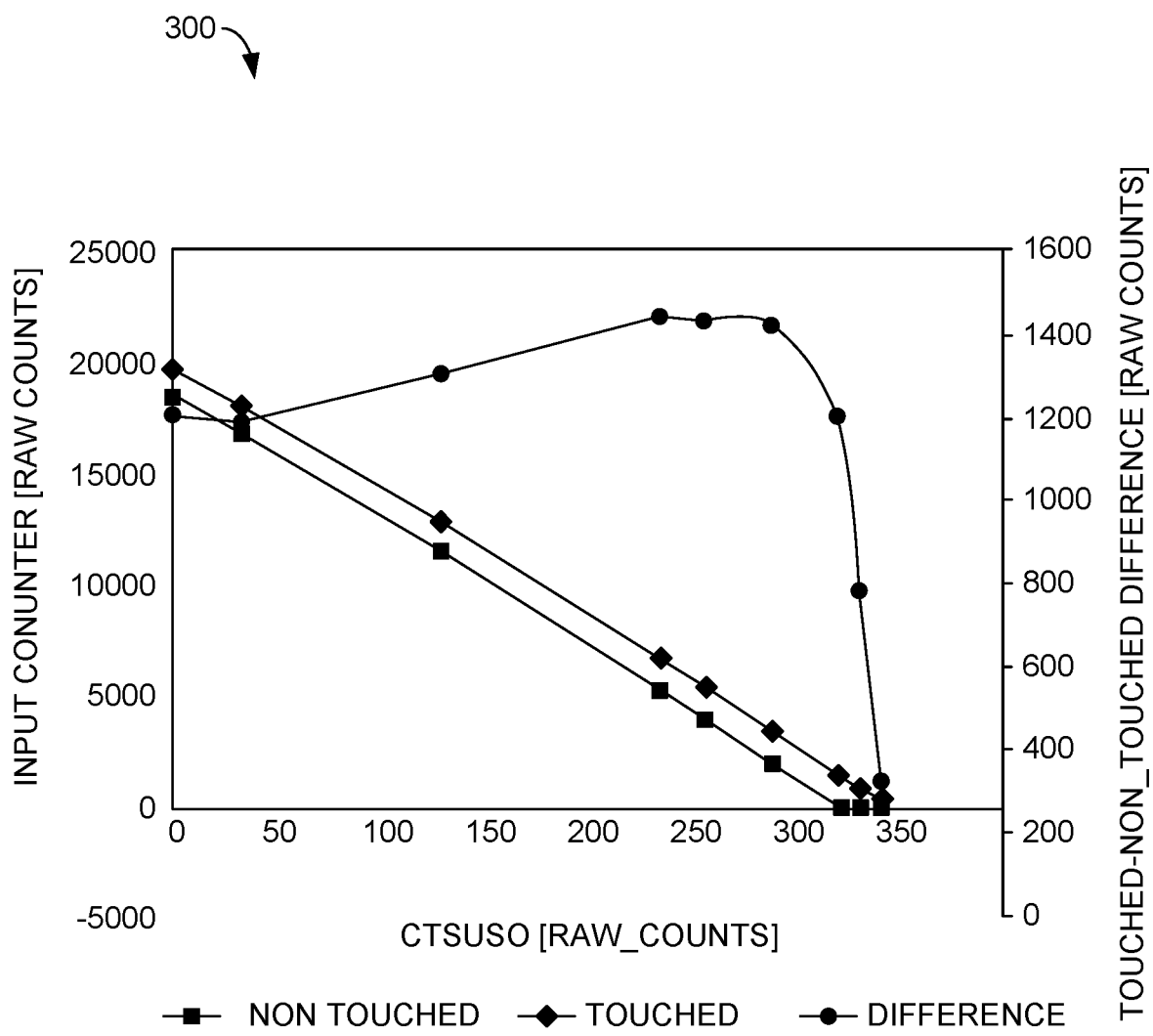
FIG. 3 is a graph of a behavior of a self-capacitance button, implemented in accordance with an embodiment of the present invention.
Figure 4:
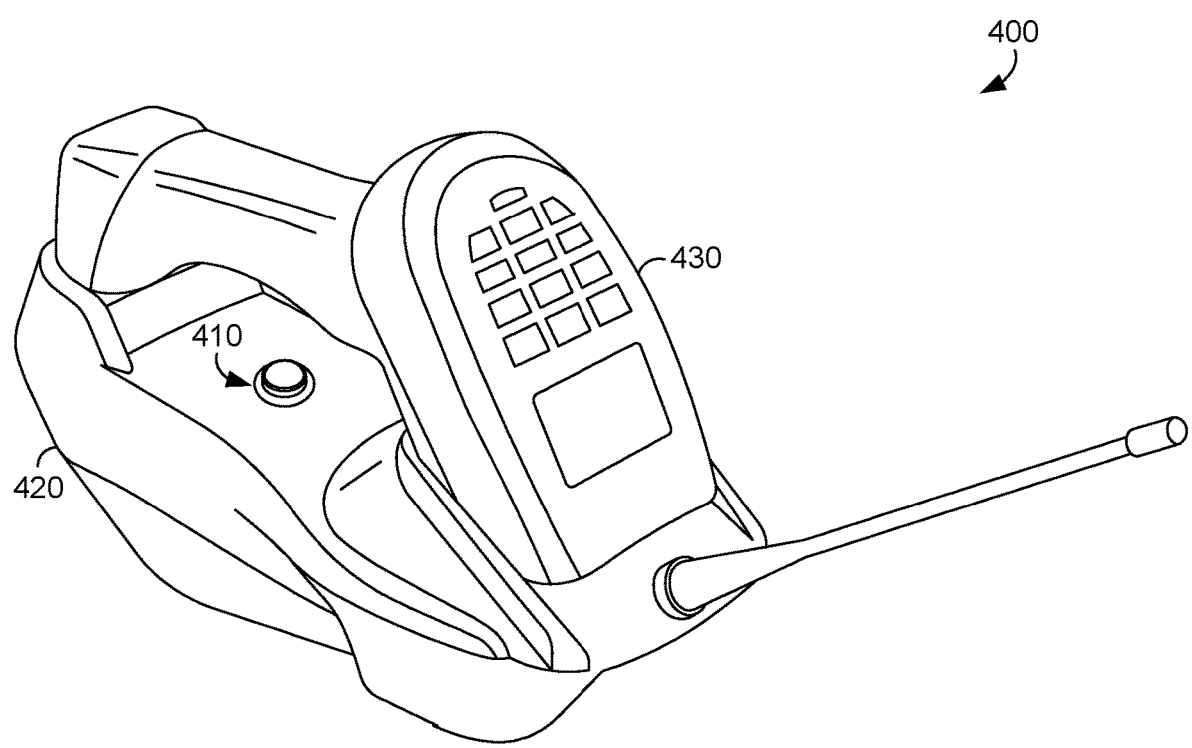
FIG. 4 is an illustration of a barcode reader, implemented in accordance with an embodiment of the present invention.

The Capacitive Touch Sensing Unit (CTSU) measures the capacitance. The change in capacitance is observed by the software in the processor. Typically, the CTSU can convert the capacitance that the human body generates at the finger to a current. The CTSUSO (CTSU Sensor Offset) is a register used to calibrate the peripheral so that the input value matches with a reference value. The register may contain the CTSU sensor offset adjustment value. In FIG. 3, a graph 300 shows a value coming from the "Input counter" if the CTSUSO (calibration register) is changed. The values have been acquired for a pressed and for a released button. By changing the calibration register, the input counter value changes. However, the difference between pressed and released remains constant in a large range, such as 0-300. Graph 300 shows that for different calibration values the input changes, and for a very large range, the difference between a pressed capacitive button and a not pressed capacitive button remains approximately constant. This means that if button 410 is not calibrated, it is not possible to recognize a pressed-released state at start up, but is always possible to recognize a tap at button 410 due to input variation in the capacitance. Therefore, the user can tap on button 410 for a defined time to induce a calibration. That defined time can vary depending on how an embodiment of the present invention is implemented. In some embodiments, the defined time may be a repetitive tap to distinguish the tap from other types of inputs. In other embodiments, the defined time may be a press of button 410 for an amount of time.

Put another way, FIG. 3 is a graph that shows the behavior of a self capacitance button if the offset register of the peripheral (the one where the calibration value is normally written at startup to have the button correctly working without calibration) is modified. FIG. 3 shows what input values will be seen if the button is not calibrated (i.e. where the CTSUSO is random) and the button is pressed or released.

In some embodiments of the present invention, once the system recognizes the tap of button 410, the system may be implemented to provide a visual or acoustic warning to ask the user to set the button in a defined state, such as "touch the button" or "do not touch the button" to start calibration.

In other embodiments, the system can immediately proceed to starting the calibration after recognition of the tap.

In some embodiments of the present invention, button 410 may be completely inoperative due to some failure or fault in the system or product software. In such embodiments, barcode reader 400 may be used to scan a configuration label or barcode, which triggers the calibration of button 410. It is noted that barcode reader 400 has a processor inside either base station 420 or scanner gun 430.

The capacitive sensing peripheral (button 410) integrated into the processor is composed of two counters. A first counter takes the input from a current controlled oscillator (ICO). The frequency of this first counter is dependent on the current passing through an external pin connected to button 410. When the external capacitance is higher, the current is higher, the ICO frequency is higher, and the value of the first counter is higher every time it is copied and reset. The value read from the first counter is a raw count value that increases with an increase in external capacitance. The value of the first counter is not read in picofarads (pF). In embodiments of the present invention, this first counter needs to be calibrated in order for the system or product to function correctly.

A second counter is created from an identical circuit as the first counter with an exception that the ICO is regulated by an internal current generator. The value of the second counter is used as a reference value. A threshold is obtained by adding the reference value to a constant offset. The threshold value is compared to the value of the first counter (i.e. the value related to the touch of button 410). If the first counter value is larger than the threshold value, then one knows button 410 is pressed. Otherwise, button 410 is not pressed or is in a released state.

In embodiments of the present invention, the threshold value usually remains constant. However, variations in the threshold value can be observed if the system temperature changes. A calibration step allows for tuning of the first counter so that an output value is almost equal to the second counter or reference value.

Figure 7:
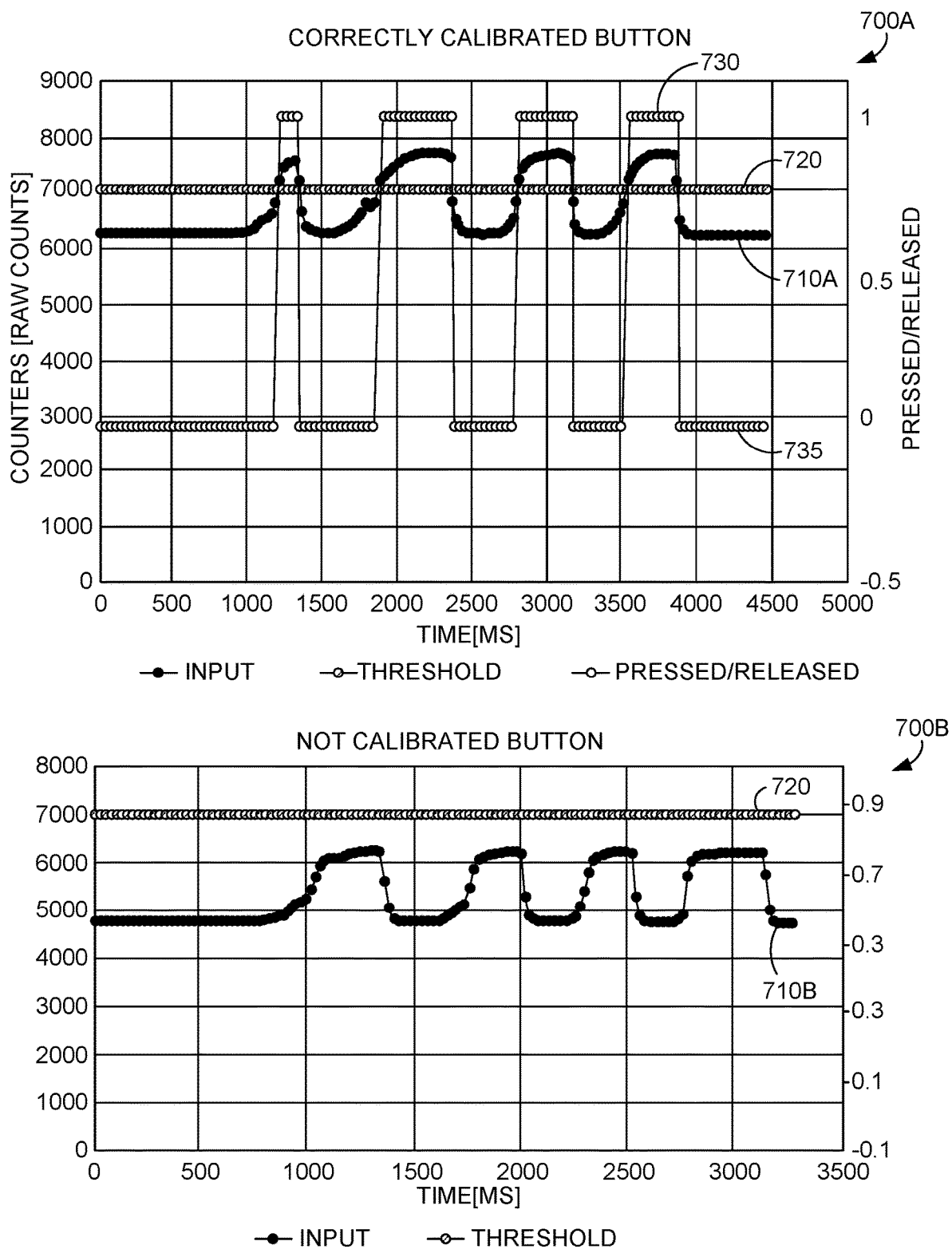
FIG. 7 is a graphical representation of two graphs where one graph illustrates a correctly calibrated button and one graph illustrates an incorrectly calibrated button, for embodiments of the present invention.

Turning now to FIG. 7, a graph 700A of correctly calibrated button 410 is shown. A threshold 720 is equal to the reference value plus the constant offset. When button 410 is pressed by finger 130, the capacitance increases, resulting in an increase of an input counter value 710A. If input counter value 710A passes threshold 720, button 410 is considered in a pressed state as shown by pressed 730. Otherwise, button 410 is considered to be in a released (not pressed) stated as shown by released 735.

A graph 700B shows a not-calibrated button 410 or a button 410 that is out of calibration. When button 410 is pressed by finger 130, the capacitance increases, resulting again in the increase of an input counter value 710B. However, in graph 700B, input counter value 710B is not able to pass threshold 720, indicating a not-calibrated condition for button 410. As a result, the system cannot detect a "pressed" event, but the behavior of the user can be observed from input variations caused by the tapping of button 410. Under such circumstances, an immediate calibration procedure can be started or the system can provide a visual or acoustical indication to the user to take further action to start the calibration procedure or that the calibration procedure will start.

Figure 5:
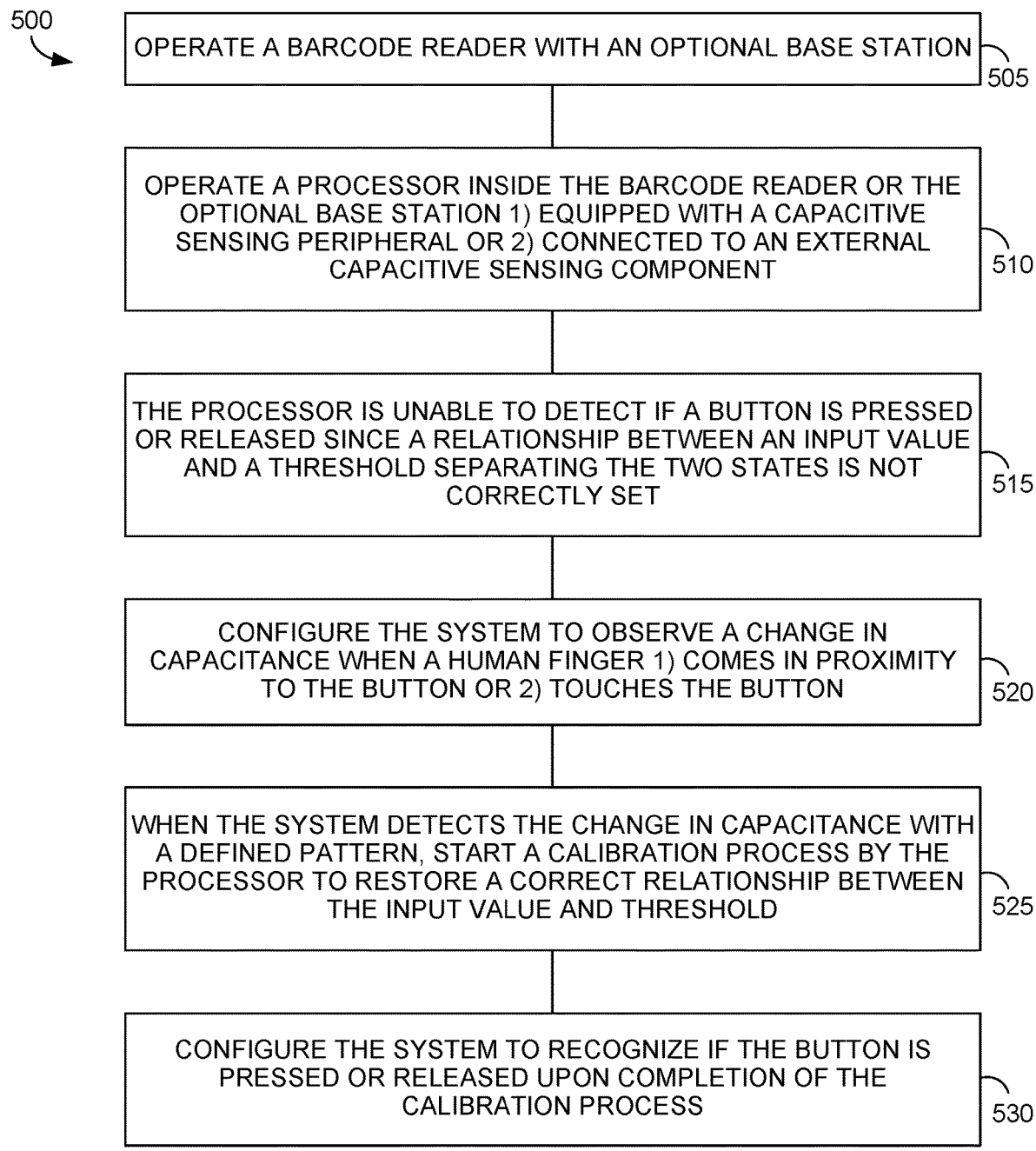
FIG. 5 is a process for a recovery strategy for a capacitive button calibration for a system that does not perform calibration at start-up, implemented in accordance with an embodiment of the present invention.

In FIG. 5, a method for a recovery strategy for a capacitive button calibration when calibration is not performed at start-up is shown in a process 500. In a step 505, barcode reader 400 operates with the optional base station 420. In a step 510, a processor operates inside barcode reader 400 or the optional base station 420. The processor is equipped with a capacitive sensing peripheral (410) or connected to an external capacitive sensing component. In a step 515, the processor is unable to detect if the peripheral is pressed or released since a relationship between an input value and a threshold separating the two states is not correctly set. The system is configured to observe a change in capacitance when a human finger 1) comes in proximity to the capacitive sensing peripheral (410) or the external capacitive sensing component, or 2) touches the capacitive sensing peripheral (410) or the external capacitive sensing component, in a step 520. In as step 525, when the system detects the change in capacitance with a defined pattern, a calibration process is started in the processor to restore a correct relationship between the input value and threshold. In a step 530, the system is configured to recognize if the capacitive sensing peripheral or the external capacitive sensing peripheral is pressed or released upon completion of the calibration process.

Figure 6:
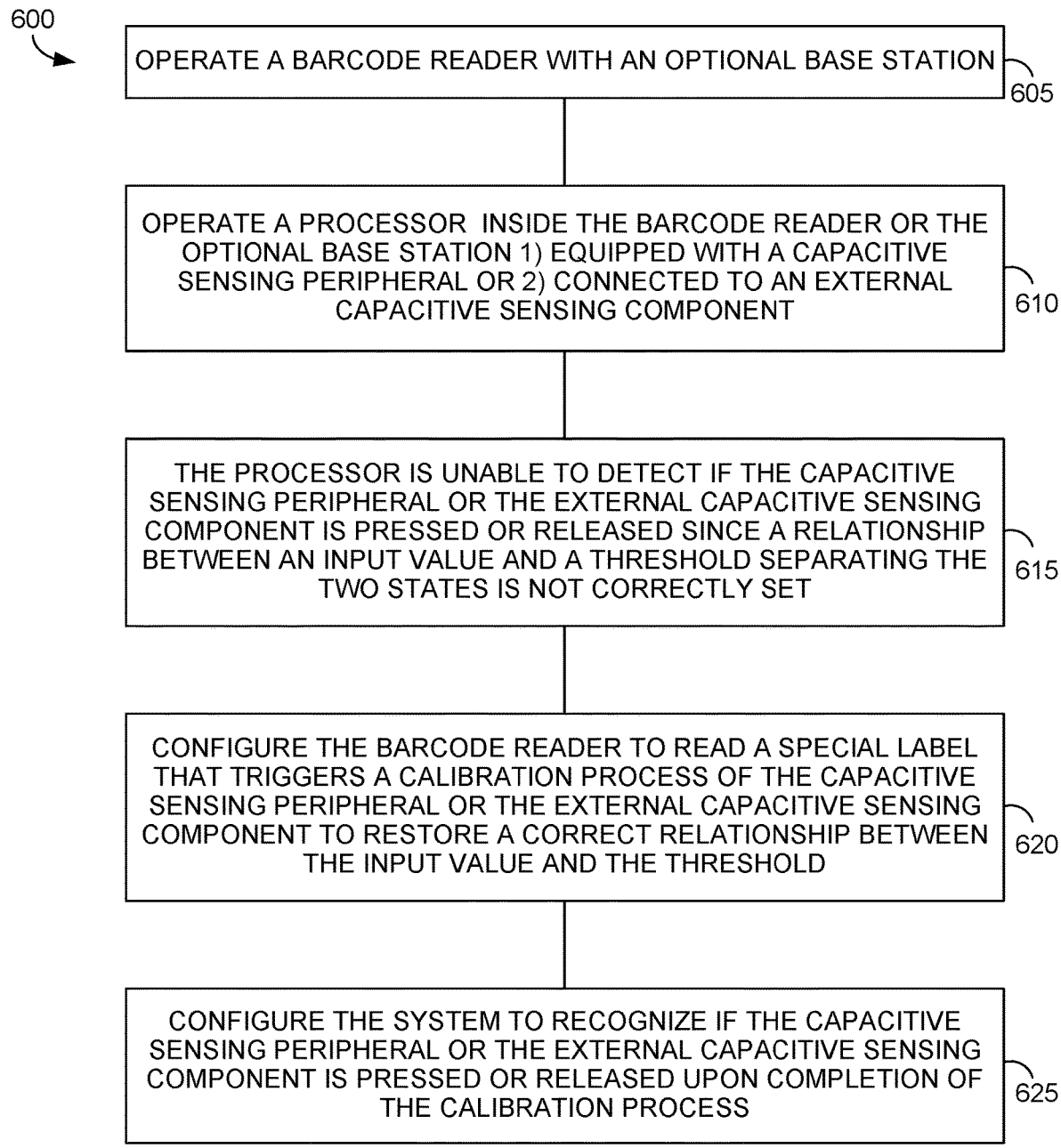
FIG. 6 is another process for a recovery strategy for a capacitive button calibration for a system that does not perform calibration at start-up, implemented in accordance with an embodiment of the present invention.

In FIG. 6, a method for a recovery strategy for a capacitive button calibration when calibration is not performed at start-up is shown in a process 600. In a step 605, barcode reader 400 operates with an optional base station 420 holding a scanner gun 430. In a step 610, a processor operates inside barcode reader 400 or the optional base station 420. The processor operates equipped with a capacitive sensing peripheral or connected to an external capacitive sensing component. The processor is unable to detect if the peripheral is pressed or released since a relationship between an input value and a threshold separating the two states is not correctly set, in a step 615. In a step 620, barcode reader 400 is configured to read a special label that triggers a calibration process of the capacitive sensing peripheral (410) or the external capacitive sensing peripheral to restore a correct relationship between the input value and the threshold. In as step 625, the system is configured to recognize if the capacitive sensing peripheral (410) or the external capacitive sensing component is pressed or released upon completion of the calibration process.

In conclusion, many different arrangements of the various components depicted, as well as components not shown, are possible without departing from the spirit and scope of embodiments of the present invention. Embodiments of the present invention have been described with the intent to be illustrative rather than restrictive. Certain features and sub-combinations are of utility and may be employed without reference to other features and sub-combinations and are contemplated to be within the scope of the claims.

What is claimed is:

1. A system for a recovery strategy for a capacitive button calibration when calibration is not automatically performed at start-up, comprising:
   a barcode reader with an optional base station;
   a processor inside the barcode reader or the optional base station 1) equipped with a capacitive sensing peripheral or 2) connected to an external capacitive sensing component;
   the processor is unable to detect if a button is pressed or released since a relationship between an input value and a threshold separating the two states is not correctly set;
   the system is configured to observe a change in capacitance when a human finger 1) comes in proximity to the button or 2) touches the button;

when the system detects the change in capacitance with a defined pattern, the processor starts a calibration process to restore a correct relationship between the input value and threshold; and the system is configured to recognize if the button is pressed or released upon completion of the calibration process.

2. The system of claim 1, wherein the change in capacitance is generated by the human finger tapping the button in a sequence that is distinct from another tap of the button.

3. The system of claim 1, wherein the capacitive sensing peripheral is a part of the processor.

4. The system of claim 1, wherein the external capacitive sensing component is an external component to the processor.

5. The system of claim 1, wherein the incorrect threshold is significantly high or significantly low relative to the capacitive input value.

6. A system for a recovery strategy for a capacitive button calibration when calibration is not automatically performed at start-up, comprising:

a barcode reader with an optional base station;

a processor inside the barcode reader or the optional base station 1) equipped with a capacitive sensing peripheral or 2) connected to an external capacitive sensing component;

the processor is unable to detect if the capacitive sensing peripheral or the external capacitive sensing component is pressed or released since a relationship between an input value and a threshold separating the two states is not correctly set;

the barcode reader is configured to read a special label that triggers a calibration process of the capacitive sensing peripheral or the external capacitive sensing component to restore a correct relationship between the input value and the threshold; and the system is configured to recognize if the capacitive sensing peripheral or the external capacitive sensing component is pressed or released upon completion of the calibration process.

7. The system of claim 6, wherein the special label is a barcode or a machine-readable optical label.

8. The system of claim 6, wherein the capacitive button is driven by a capacitive sensing peripheral.

9. The system of claim 6, wherein the capacitive button is driven by an external capacitive sensing component.

10. The system of claim 6, wherein the calibration process includes different input values of capacitance for different calibration values for the threshold value.

11. The system of claim 6, wherein the incorrect threshold is significantly high or significantly low relative to the capacitive input value.

12. A method for a recovery strategy for a capacitive button calibration for a system that does not perform calibration at start-up, comprising:

operating a barcode reader with an optional base station;

operating a processor inside the barcode reader or the optional base station 1) equipped with a capacitive sensing peripheral or 2) connected to an external capacitive sensing component, wherein the processor is unable to detect if the capacitive sensing peripheral or the external capacitive sensing component is pressed or released since a relationship between an input value and a threshold separating the two states is not correctly set;

configuring the system to observe a change in capacitance when a human finger 1) comes in proximity to the capacitive sensing peripheral or the external capacitive sensing component or 2) touches the capacitive sensing peripheral or the external capacitive sensing component;

when the system detects the change in capacitance with a defined pattern, starting a calibration process in the processor to restore a correct relationship between the input value and threshold; and configuring the system to recognize if the capacitive sensing peripheral or the external capacitive sensing component is pressed or released upon completion of the calibration process.

13. The method of claim 12, wherein the change in capacitance is generated by the human finger tapping the capacitive sensing peripheral or the external capacitive sensing component in a sequence that is distinct from another tap of the capacitive sensing peripheral or the external capacitive sensing component.

14. The method of claim 12, wherein the capacitive button is driven by a capacitive sensing peripheral.

15. The method of claim 12, wherein the capacitive button is driven by an external capacitive sensing component.

16. The method of claim 12, wherein the incorrect threshold is significantly high or significantly low relative to the capacitive input value.

* * * * *